United States Patent
Mathew et al.

(10) Patent No.: US 8,077,427 B2
(45) Date of Patent: Dec. 13, 2011

(54) FLY-HEIGHT CONTROL USING ASYNCHRONOUS SAMPLING

(75) Inventors: George Mathew, San Jose, CA (US); Jeffrey Grundvig, Loveland, CO (US); Hongwei Song, Longmont, CO (US); Yuan Xing Lee, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 10 days.

(21) Appl. No.: 12/758,122

(22) Filed: Apr. 12, 2010

(65) Prior Publication Data
US 2011/0249361 A1    Oct. 13, 2011

(51) Int. Cl.
*G11B 5/60*    (2006.01)
(52) U.S. Cl. .......................................... 360/75
(58) Field of Classification Search .................. None
See application file for complete search history.

(56) References Cited

U.S. PATENT DOCUMENTS

| | | | |
|---|---|---|---|
| 4,777,544 A * | 10/1988 | Brown et al. | 360/75 |
| 7,271,753 B1 * | 9/2007 | Padukone et al. | 341/139 |
| 7,369,341 B2 * | 5/2008 | Yokohata et al. | 360/75 |
| 7,426,090 B2 * | 9/2008 | Yamashita et al. | 360/75 |
| 7,724,461 B1 * | 5/2010 | McFadyen et al. | 360/75 |
| 7,835,104 B2 * | 11/2010 | Yamashita et al. | 360/75 |
| 7,872,821 B2 * | 1/2011 | Grundvig et al. | 360/75 |
| 2005/0024761 A1 | 2/2005 | Lou et al. | |
| 2009/0052080 A1 | 2/2009 | Eaton et al. | |
| 2009/0154003 A1 * | 6/2009 | Mathew et al. | 360/75 |
| 2009/0257145 A1 * | 10/2009 | Tsuyama | 360/75 |
| 2009/0309649 A1 * | 12/2009 | Tsuyama | 327/557 |
| 2010/0053788 A1 * | 3/2010 | Uno | 360/31 |
| 2010/0177430 A1 * | 7/2010 | Mathew et al. | 360/75 |
| 2010/0202082 A1 * | 8/2010 | Graef | 360/75 |
| 2011/0043938 A1 * | 2/2011 | Mathew et al. | 360/75 |

OTHER PUBLICATIONS

European Search Report; Mailed on Jun. 8, 2011 for the corresponding European Application No. 11 002 202.7.

* cited by examiner

*Primary Examiner* — Hoa T Nguyen
*Assistant Examiner* — James L Habermehl
(74) *Attorney, Agent, or Firm* — Mendelsohn, Drucker & Associates, P.C.; Craig M. Brown; Steve Mendelsohn

(57) ABSTRACT

In one embodiment, a hard-disk drive system performs fly-height control using a read-back mode and a loop-back mode. The read-back mode measures first and second harmonics pre-recorded on the medium and divides the first measurement by the second to obtain a read-back mode harmonic ratio. The loop-back mode measures the same first and second harmonics; however, the harmonics are provided by a write precompensation circuit rather than the medium. Further, the loop-back mode measurements are performed using asynchronous sampling to address aliasing and quantization errors. The first measurement is divided by the second to generate a loop-back harmonic ratio. In logarithm domain, the loop-back ratio is subtracted from the read-back mode ratio to remove environment-induced variations in the read path electronic circuits. The resulting harmonic ratio is subtracted from an initial harmonic ratio determined, for example, during manufacturing, to determine how much the harmonic ratio has changed.

18 Claims, 7 Drawing Sheets

FLY-HEIGHT CONTROL USING ASYNCHRONOUS SAMPLING

BACKGROUND OF THE INVENTION

1. Field of the Invention

The present invention relates to hard-disk drive (HDD) systems, and, in particular, to controlling fly height in such systems.

2. Description of the Related Art

In hard-disk drive (HDD) systems, the spacing between (i) the element of a read/write head and (ii) the surface of the platter, commonly referred to as fly height, is an important parameter affecting both capacity and performance. In general, reducing fly height during writing and/or reading operations improves bit-error rate. However, reducing the fly height too significantly can result in the read and/or write element contacting the surface of the platter. Such contact is typically undesired because it may corrupt data stored on the platter and possibly even damage the platter and/or heads.

Typically, fly height is set during manufacturing. However, during operation, fly height may change due to environmental conditions such as temperature and/or voltage variations. For example, when a write operation is performed, a write current is applied to the head. Note that the read and write elements are typically co-located on the same head, and that, reading and writing may be performed using a single read/write element or separate read and write elements. For the following discussion, the term "head" refers to a component that may have any of these configurations. The write current may cause the write element to heat up, and as a result, the material of the write element may expand such that the write element protrudes from its initial orientation towards the surface of the platter. When the write operation ceases, the write element cools and the material of the write element contracts such that the write element returns to (or near) its initial orientation. HDD system designers have expended a substantial amount of effort attempting to compensate for read and/or write element protrusion. Discussion of some of these efforts may be found in, for example, Schultz, "Thermal Fly-height Control (TFC) Technology in Hitachi Hard Disk Drives," www.hitachi.com, and Tang, "Overview of Fly Height Control Applications in Perpendicular Magnetic Recording," IEEE Transactions on Magnetics, Vol. 43, No. 2, February 2007, the teachings all of which are incorporated herein by reference in their entirety.

FIG. 1 shows a simplified flow diagram 100 of a prior-art method for adjusting fly height. During manufacturing, two periodic patterns, which are used during operation of the HDD system for detecting change in fly height, are written to specified locations on the platter (action 102). The two periodic patterns may be written to the platter as one recorded pattern in which the two periodic patterns are combined, or as two separate recorded patterns. For example, one recorded pattern, which is constructed from (i) a first periodic pattern having a first frequency $f_1$ (e.g., a first harmonic of a periodic pattern) and (ii) a second periodic pattern having a second frequency $f_2$ (e.g., a third harmonic of a periodic pattern), may be written to a single track of the platter. Alternatively, a first pattern having a first frequency $f_1$ may be written to a first track of the platter, and a second pattern having a second frequency $f_2$ may be written to a second track of the platter.

Further, during manufacturing (e.g., calibration), an operating fly height $d_0$ is selected (action 104) using any suitable fly-height selection technique. Such a technique might involve touchdown of the head to the surface of the platter. Along with selecting an operating fly height $d_0$, a corresponding harmonic ratio $R_0$ (action 104) is determined at the operating fly height $d_0$. Harmonic ratio $R_0$ may be represented as shown in Equation (1):

$$R_0(k_1, k_2) = \ln\left(\frac{V_0(k_1)}{V_0(k_2)}\right) = (k_2 - k_1)d_0 + B_0(k_2, k_1) \quad (1)$$

where $k_1$ and $k_2$ are the wave numbers (i.e., $k=2\pi/\lambda$) corresponding to frequencies $f_1$ and $f_2$, respectively, $\lambda$ denotes wavelength, $V_0(k_1)$ and $V_0(k_2)$ are the read-back signal strengths corresponding to frequencies $f_1$ and $f_2$, respectively, and $$B_0(k_1, k_2) = \ln\left(\frac{A_0(k_1)}{A_0(k_2)}\right),$$

where $A_0(k_1)$ and $A_0(k_2)$ are the channel gains corresponding to frequencies $f_1$ and $f_2$, respectively. Further, Equation (1) assumes that read-back signal strengths $V_0(k_1)$ and $V_0(k_2)$ may be represented by the Wallace spacing loss equation as follows:

$$V_t(k_i) = A_t(k_i)e^{-k_i d_t} \quad (2)$$

where subscript i indicates the periodic pattern read back (i.e., $i=1$ and $i=2$ for the patterns corresponding to frequencies $f_1$ and $f_2$, respectively), and subscript t indicates the point in time that signal $V_t(k_i)$ is read back (i.e., $t=0$ during calibration). Note that, according to the Wallace equation, for a given wave number $k_i$ (i.e., frequency), the read-back signal strength $V_t(k_i)$ increases as the fly height $d_t$ decreases.

After manufacturing, and during operation of the HDD system (i.e., at a time other than $t=0$), fly-height measurements may be initiated using any suitable trigger. For example, fly-height measurements may be performed based on a change of temperature, a change in performance of the HDD system, or after a specified amount of time has elapsed. Once a fly-height measurement is initiated (decision 106) (e.g., at time $t>0$), the HDD system measures the read-back signal strength $V_t(k_1)$ at the first frequency $f_1$ and the read-back signal strength $V_t(k_2)$ at the second frequency $f_2$, both of which may be represented as shown in Equation (2) (action 108).

A harmonic ratio $R_t$ is calculated (action 110) based on the first and second read-back signal strengths $V_t(k_1)$ and $V_t(k_2)$, and may be represented as shown in Equation (3) below:

$$R_t(k_1, k_2) = \ln\left(\frac{V_t(k_1)}{V_t(k_2)}\right) = (k_2 - k_1)d_t + B_t(k_2, k_1) \quad (3)$$

where time $t>0$, $V_t(k_1)$ and $V_t(k_2)$ are the read-back signal strengths corresponding to frequencies $f_1$ and $f_2$, respectively, and $$B_t(k_1, k_2) = \ln\left(\frac{A_t(k_1)}{A_t(k_2)}\right),$$

where $A_t(k_1)$ and $A_t(k_2)$ are the channel gains corresponding to frequencies $f_1$ and $f_2$, respectively. Note that, in Equation (3), $R_t(k_1, k_2)$ may be determined from $V_t(k_1)$ and $V_t(k_2)$, and that both fly height $d_t$ and $B_t(k_1, k_2)$ are unknown.

To eliminate unknown $B_t(k_1, k_2)$ from Equation (3), it may be assumed that $B_t(k_1, k_2)=B_0(k_1,k_2)$. Then, a difference between harmonic ratios $R_t(k_1, k_2)$ and $R_0(k_1,k_2)$ may be calculated (action 112) by subtracting Equation (1) from Equation (3) as follows in Equation (4):

$$\Delta R = R_t(k_1,k_2) - R_0(k_1,k_2) = (k_2-k_1)\Delta d \quad (4)$$

where, $\Delta d = d_t - d_0$. Further, Equation (4) may be rewritten as shown in Equation (5):

$$\Delta R = \frac{2\pi}{v}(f_2 - f_1)\Delta d \text{ and } \Delta R(dB) = \frac{2\pi}{v}(f_2 - f_1)\Delta d \cdot \frac{20}{\ln(10)} \quad (5)$$

where v=the linear velocity of the platter under the head.

From Equations (4) or (5), the change in fly height $\alpha d$ may be determined, and this change may be used to adjust the fly height (action 114) as appropriate. For example, in one common method, an electrically resistive heating element may be located on the head to control expansion and contraction of the write and/or read elements. This heating element may be controlled by a thermal actuator that increases or decreases the heat applied by the heating element based on the detected change in fly height $\Delta d$ to expand or contract the material of the write and/or read elements. In other common methods, other fly-height actuators such as (i) electrostatic microactuators, (ii) piezoelectric actuators, and (iii) fly-height actuators, based on thermal, electrostatic, or piezoelectric techniques, that alter the air-flow or the shape of the air-bearing slider may be used to control fly height. Note that, since $f_1$ and $f_2$ (and similarly $k_1$ and $k_2$) are constant, the controller may adjust fly height based on $\Delta R$ without separately computing $\Delta d$. This process may be repeated (decision 116), where each repetition is triggered based on a suitable criterion such as one of those discussed above in relation to decision 106.

One problem with the method of FIG. 1 is that $B_t(k_1, k_2)$ might not be equal to $B_0(k_1, k_2)$. $B_t(k_1, k_2)$ and $B_0(k_1, k_2)$ may change based on, for example, environmental variations that affect the electronics in the HDD system read path. Deviations between $B_t(k_1, k_2)$ and $B_0(k_1, k_2)$ may lead to inaccuracies in $\Delta R$ in Equations (4) and (5) and, consequently, to inaccuracies in the measured change in fly height $\Delta d$. To meet relatively demanding requirements for fly-height accuracy, $\Delta R$ should preferably vary only within, for example, a few tenths of a dB over the complete range of variation in environmental conditions (e.g., voltage and temperature). To overcome these inaccuracies, a method for measuring change in fly height $\Delta d$ is needed that is not affected by these variations in environmental conditions.

SUMMARY OF THE INVENTION

In one embodiment, the present invention is a method usable to control fly height of a head over a medium in a data storage device. The method comprises determining, in a read-back mode, a first value based on a first signal received by a read path of the data storage device. The first signal corresponds to pre-recorded data read from the medium and is characterized by at least one periodic pattern. The first value is generated by sampling the first signal at a first sampling frequency. The method further comprises determining, in a loop-back mode, a second value based on a second signal received by the read path directly from a write path of the data storage device. The second signal bypasses the medium and is characterized by the at least one periodic pattern. The second value is generated by sampling the second signal at a second sampling frequency different from the first sampling frequency. The method yet further comprises generating a third value based on the first and second values, wherein the third value is usable to control the fly height.

In another embodiment, the present invention is an apparatus usable to control fly height of a head over a medium in a data storage device. The data storage device has a read path that is configurable in a read-back mode to receive a first signal corresponding to pre-recorded data read from the medium and characterized by at least one periodic pattern. The read path that is also configurable in a loop-back mode to receive a second signal directly from a write path of the data storage device, the second signal bypassing the medium and characterized by the at least one periodic pattern. The apparatus comprises an analog-to-digital converter and a digital processor. In the read-back mode, the analog-to-digital converter samples the first signal at a first sampling frequency. In the loop-back mode, the analog-to-digital converter samples the second signal at a second sampling frequency different from the first sampling frequency. In the read-back mode, the digital processor determines a first value based on samples of the first signal. In a loop-back mode, the digital processor determines a second value based on samples of the second signal. Further, the digital processor generates a third value based on the first and second values, wherein the third value is usable to control the fly height.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 2:
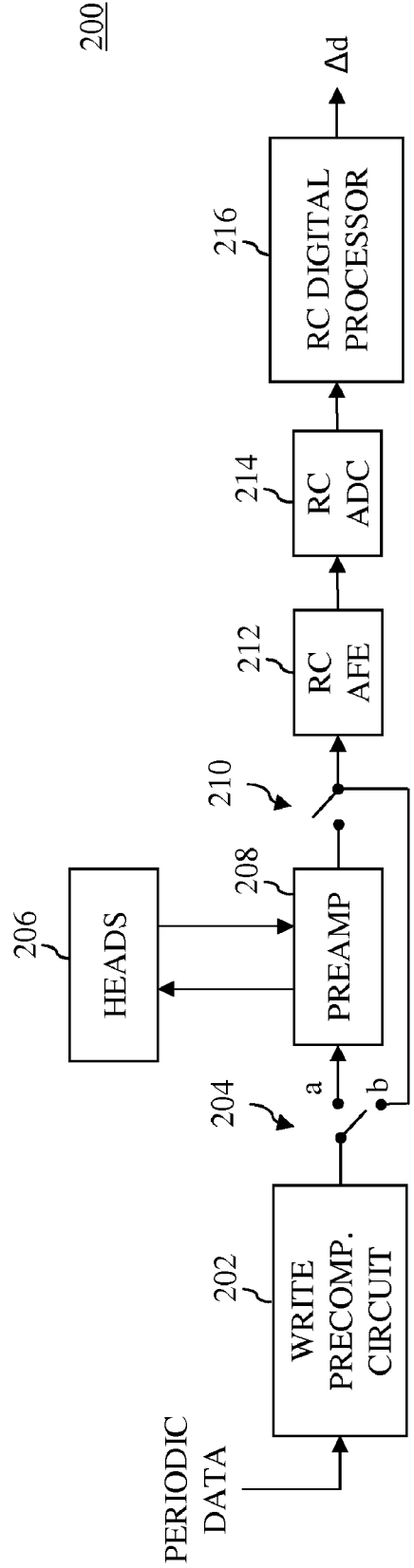
FIG. 2 shows a simplified block diagram of at least part of one implementation of a hard-disk drive (HDD) system that may be used to control fly height.

FIG. 2 shows a simplified block diagram of at least part of one implementation of a hard-disk drive (HDD) system 200. HDD system 200 has components that may be used to control the fly height of one or more heads over the medium (e.g., one or more platters). In general, HDD system 200 uses two modes to control fly height: a read-back mode and a loop-back mode. In the read-back mode, heads 206 and preamplifier 208 are connected in-line and write precompensation circuit 202 is disconnected such that harmonics strengths may be measured based on data read from the storage medium. A harmonic ratio for the read-back mode is then generated by dividing one of the measured harmonic strengths with another. In the loop-back mode, write precompensation circuit 202 is connected in-line, and heads 206 (and consequently the medium) and preamplifier 208 are disconnected, such that harmonic strengths may be measured based on data provided by write precompensation circuit 202. A harmonic ratio for the loop-back mode is then generated by dividing one of the measured harmonic strengths with another. In logarithm domain, the harmonic ratio for the loop-back mode is subtracted from the harmonic ratio for the read-back mode to eliminate effects of variations in environmental conditions in the read channel as discussed further below. To further understand how a fly-height control operation may be performed by HDD system 200, HDD system 200 is discussed in conjunction with the flow diagram of FIG. 3.

Figure 1:
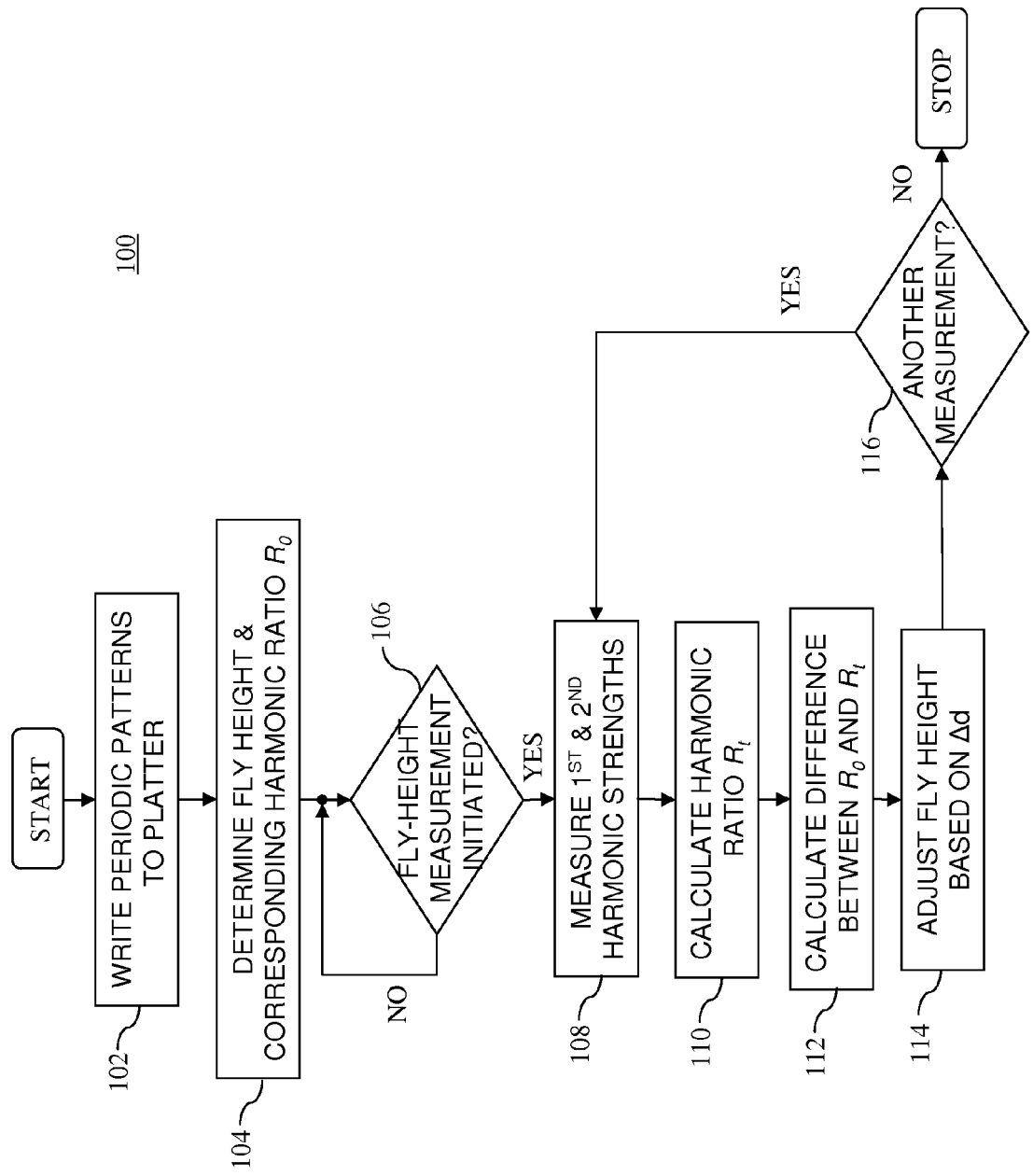
FIG. 1 shows a simplified flow diagram of a prior-art method for adjusting fly height.
Figure 3:
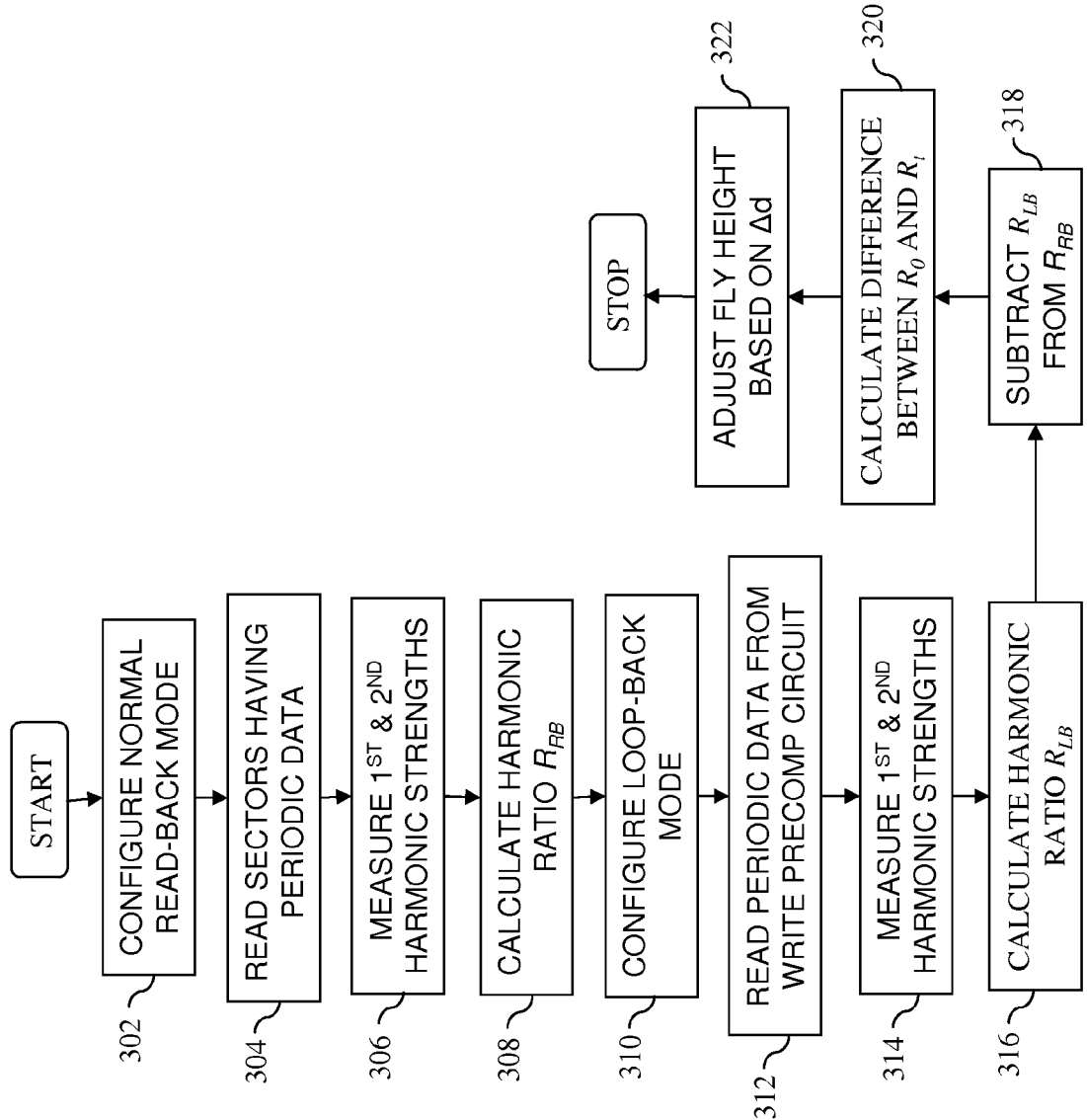
FIG. 3 shows a simplified flow diagram of one implementation of a fly-height control operation that may be performed by the HDD system of FIG. 2.

FIG. 3 shows a simplified flow diagram 300 of one implementation of a fly-height control operation that may be performed by HDD system 200 of FIG. 2. The fly-height control operation may be initiated using any suitable triggering event, such as those described above in relation to action 106 of FIG. 1. Once initiated, HDD system 200 is configured in the read-back mode (action 302), if not already configured in such mode, by moving switch 204 between positions "a" and "b" and closing switch 210, such that heads 206 and preamplifier 208 are connected in-line and write precompensation circuit 202 is disconnected. A first periodic pattern having a first frequency $f_1$ and a second periodic pattern having a second frequency $f_2$ are then read from the medium (action 304). The two periodic patterns, which are typically prerecorded onto a specified area of the platter during manufacturing, may be recorded as one recorded pattern by combining the first and second periodic patterns or as two separate recorded patterns, as described above in relation to action 102 of FIG. 1. Note that, to record the two periodic patterns, switch 204 is moved to position "a" and switch 210 is open, and the patterns are provided by write precompensation circuit 202 to preamplifier 208, which amplifies the patterns and provides the patterns to heads 206, which write the patterns on the storage medium.

Upon reading back the two periodic patterns, the patterns are amplified by preamplifier 208 and processed by read channel (RC) analog front end (AFE) 212, which may perform suitable processing to condition the signal, such as high-pass filtering, variable gain adjustment, magneto-resistive head asymmetry (MRA) compensation, and continuous-time low-pass filtering. The two conditioned periodic patterns are then converted from analog format to digital format using RC analog-to-digital converter (ADC) 214, which performs baud-rate sampling (i.e., samples at a rate of one sample per bit).

RC digital processor 216 measures a first harmonic strength $V_{RB,t}(k_1)$ of the first periodic pattern and a second harmonic strength $V_{RB,t}(k_2)$ of the second harmonic pattern (action 306), each of which may be represented as shown in Equation (2), where subscript RB indicates the read-back mode. RC digital processor 216 then divides the first measured harmonic $V_{RB,t}(k_1)$ by the second measured harmonic $V_{RB,t}(k_2)$ (action 308) to obtain a harmonic ratio $R_{RB,t}(k_1,k_2)$ for the read-back mode as shown in Equation (6):

$$R_{RB,t}(k_1, k_2) = \ln\left(\frac{V_{RB,t}(k_1)}{V_{RB,t}(k_2)}\right) \qquad (6)$$

where the value of $R_{RB,t}(k_1,k_2)$ is affected by the environment-induced variations in (i) heads 206 and the medium and (ii) the analog signal path (i.e., preamplifier 208, RC AFE 212, and transmission line inter-connections between the various blocks). Equation (6) has an interpretation analogous to that for Equation (3).

HDD system 200 is then configured in the loop-back mode (action 310) by moving switch 204 to position "b" and opening switch 210, such that (i) write precompensation circuit 202 is connected in-line and (ii) heads 206 and preamplifier 208 are disconnected. Rather than reading back the two periodic signals from the medium, the same two periodic signals that were written to the medium are provided to RC AFE 212 by write precompensation block 202 (action 312). The two periodic signals are processed by RC AFE 212, RC ADC 214, and RC digital processor 216 as described above to generate a first harmonic strength $V_{LB,t}(k_1)$ of the first periodic pattern and a second harmonic strength $V_{LB,t}(k_2)$ of the second harmonic pattern (action 314), where subscript LB indicates the loop-back mode. RC digital processor 216 divides the first measured harmonic $V_{LB,t}(k_1)$ by the second measured harmonic $V_{LB,t}(k_2)$ (action 316) to obtain a harmonic ratio $R_{LB,t}(k_1,k_2)$ for the loop-back mode as shown in Equation (7):

$$R_{LB,t}(k_1, k_2) = \ln\left(\frac{V_{LB,t}(k_1)}{V_{LB,t}(k_2)}\right) \qquad (7)$$

where the value of $R_{LB,t}(k_1,k_2)$ is affected by environment-induced variations in the analog signal path (i.e., RC AFE 212), but not by environment-induced variations in preamplifier 208, heads 206, the storage medium, and associated inter-connections since these components are disconnected.

RC digital processor 216 subtracts the harmonic ratio $R_{LB,t}(k_1,k_2)$ for the loop-back mode from the harmonic ratio $R_{RB,t}(k_1,k_2)$ for the read-back mode to obtain a harmonic ratio $R_t(k_1,k_2)$ at time t (action 318). Subtracting harmonic ratio $R_{LB,t}(k_1,k_2)$ from harmonic ratio $R_{RB,t}(k_1,k_2)$ removes the environment-induced variations of RC AFE 212. The resulting harmonic ratio $R_t(k_1,k_2)$ is analogous to harmonic ratio $R_t(k_1,k_2)$ in Equation (3), without the environment-induced variations in RC AFE 212. Note that, if the harmonic ratio $R_{LB,t}(k_1,k_2)$ for the loop-back mode and the harmonic ratio $R_{RB,t}(k_1,k_2)$ for the read-back mode are not represented in logarithmic form, then harmonic ratio $R_{RB,t}(k_1,k_2)$ for the read-back mode is divided by the harmonic ratio $R_{LB,t}(k_1,k_2)$ for the loop-back mode.

RC digital processor 216 subtracts an initial harmonic ratio $R_0(k_1,k_2)$, determined, for example, during manufacturing in a manner analogous to that described above in relation to action 104 of FIG. 1, from harmonic ratio $R_t(k_1,k_2)$ as shown in Equation (4) to determine how much the initial harmonic ratio $R_0(k_1,k_2)$ has changed (action 320) (e.g., determine $\Delta R$). Note that, the procedure followed in measuring the initial harmonic ratio $R_0(k_1,k_2)$ may be the same as that described above for measuring the harmonic ratio $R_t(k_1,k_2)$ except that it is done at t=0. The change in fly height $\Delta d$ may be determined based on $\Delta R$, and the change in fly height $\Delta d$ or $\Delta R$ may be used by a fly-height controller (not shown) to adjust the fly height (action 322) in a suitable manner, such as those discussed in relation to action 114 of FIG. 1.

Figure 4:
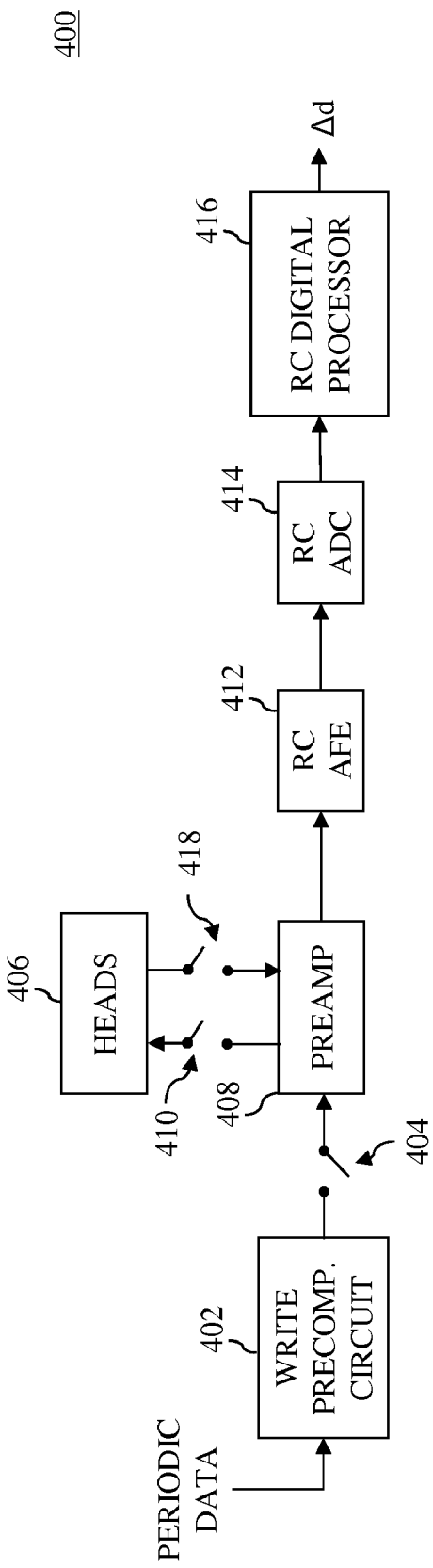
FIG. 4 shows simplified block diagram of at least part of another implementation of an HDD system that may be used to control fly height.

FIG. 4 shows simplified block diagram of another implementation of an HDD system 400 that may be used to control fly height. HDD system 400 has write precompensation circuit 402, heads 406, preamplifier 408, RC AFE 412, RC ADC 414, and RC digital processor 416, which perform operations similar to those of the analogous components of HDD system 200 of FIG. 2. To control fly height, HDD system 400 may operate in a manner analogous to that of HDD system 200 (e.g., as described in relation to FIG. 3). However, in loop-back mode, both write precompensation circuit 402 and preamplifier 408 are connected in-line by closing switch 404, and heads 406 (and consequently the medium) are disconnected by opening switches 418 and 410. This is in contrast to HDD system 200, which disconnects preamplifier 208 during the loop-back mode. During the read-back mode, the read elements of the one or more heads 406 (and consequently the storage medium) are connected in-line by closing switch 418, the write elements of heads 406 are disconnected by opening switch 410, and write precompensation circuit 402 is disconnected by opening switch 404.

The loop-back mode discussed above may be affected by quantization error and frequency aliasing at the RC ADC. In the loop-back mode, the noise that is typically introduced while reading data from the storage medium is not present (or is weak) at the input to the RC ADC. Since there is no noise (or the noise is too weak) to average out the quantization error, the quantization error behaves like a deterministic distortion.

To remedy the quantization error, variable-gain adjustment (VGA) dithering may be used by the RC AFE to effectively inject noise into the input of the RC ADC. To perform VGA dithering in the loop-back mode, the first and second periodic patterns are read back and measured to generate first and second measured harmonic strengths $V_{LB,t}(k_1)$ and $V_{LB,t}(k_2)$ as described above. This process is repeated to generate multiple measurements for each of the first and second periodic patterns, and, for each iteration, the VGA value is changed. The multiple measurements of the first periodic pattern are averaged, and similarly, the multiple measurements of the second periodic pattern are averaged. The average for the first periodic pattern may then be divided by the average for the second periodic pattern to obtain the harmonic ratio $R_{LB,t}(k_1, k_2)$ for the loop-back mode. Due to the repeated measurements, this VGA dithering approach can be relatively time consuming Further, there is typically a limited number of VGA values that can be used, so the amount of noise averaging achievable by the VGA dithering may be limited.

In the loop-back mode, frequency aliasing arises because the roll-off characteristics of RC AFE preceding the RC ADC is not steep enough to reject out-of-band harmonics. Typically, if the roll-off characteristics are not steep (i.e. attenuate heavily after cut-off frequency), then the out-of-band harmonics will get folded back (weighted by CTF spectrum) to the in-band through aliasing. Measurement of harmonics lying close to the Nyquist frequency can be significantly affected by aliasing. To minimize aliasing, the cut-off frequency of the continuous-time low-pass filter (CTF) of the RC AFE can be lowered. However, lowering the cut-off frequency may restrict the harmonic frequencies of the first and second periodic patterns to lower values. Further, use of lower harmonic frequencies typically reduces the sensitivity of the RC harmonic sensor to fly-height changes.

As an alternative to using VGA dithering and lowering the cut-off frequency, the loop-back mode may be performed using asynchronous sampling at the RC ADC. As discussed below in relation to FIG. 5, asynchronous sampling may be used to deal with both quantization error and frequency aliasing issues present in the loop-back mode. This asynchronous sampling approach requires only one measurement, and therefore, it may be performed in less time than the VGA dithering approach. The asynchronous nature of the sampling helps to both (i) average out quantization error and (ii) minimize the effect of frequency aliasing. Further, the asynchronous sampling approach allows the use of higher harmonic frequencies than the VGA dithering approach, which in turn (i) allows the RC harmonic sensor to have a higher sensitivity to fly-height changes and (ii) increases the amount of allowable error in the harmonic measurements to meet a given fly-height accuracy.

Figure 5:
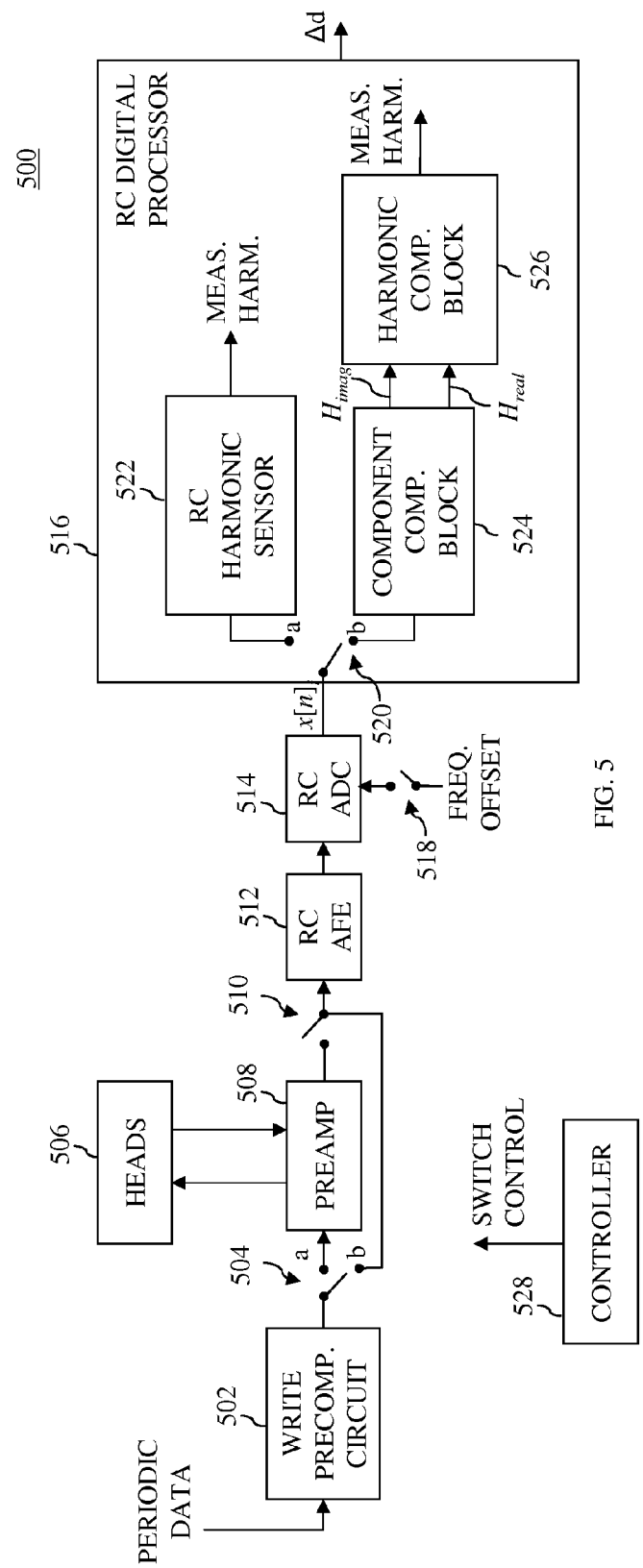
FIG. 5 shows a simplified block diagram of at least part of an HDD system according to one embodiment of the present invention that employs asynchronous sampling to control fly height.

FIG. 5 shows a simplified block diagram of an HDD system 500 according to one embodiment of the present invention that employs asynchronous sampling to control fly height. HDD system 500 has write precompensation circuit 502, heads 506, preamplifier 508, RC AFE 512, and RC ADC 514, which perform operations similar to those of the analogous processing of FIG. 2. To further understand how a fly-height control operation may be performed by system 500, system 500 is discussed in conjunction with the flow diagram of FIG. 6.

Figure 6:
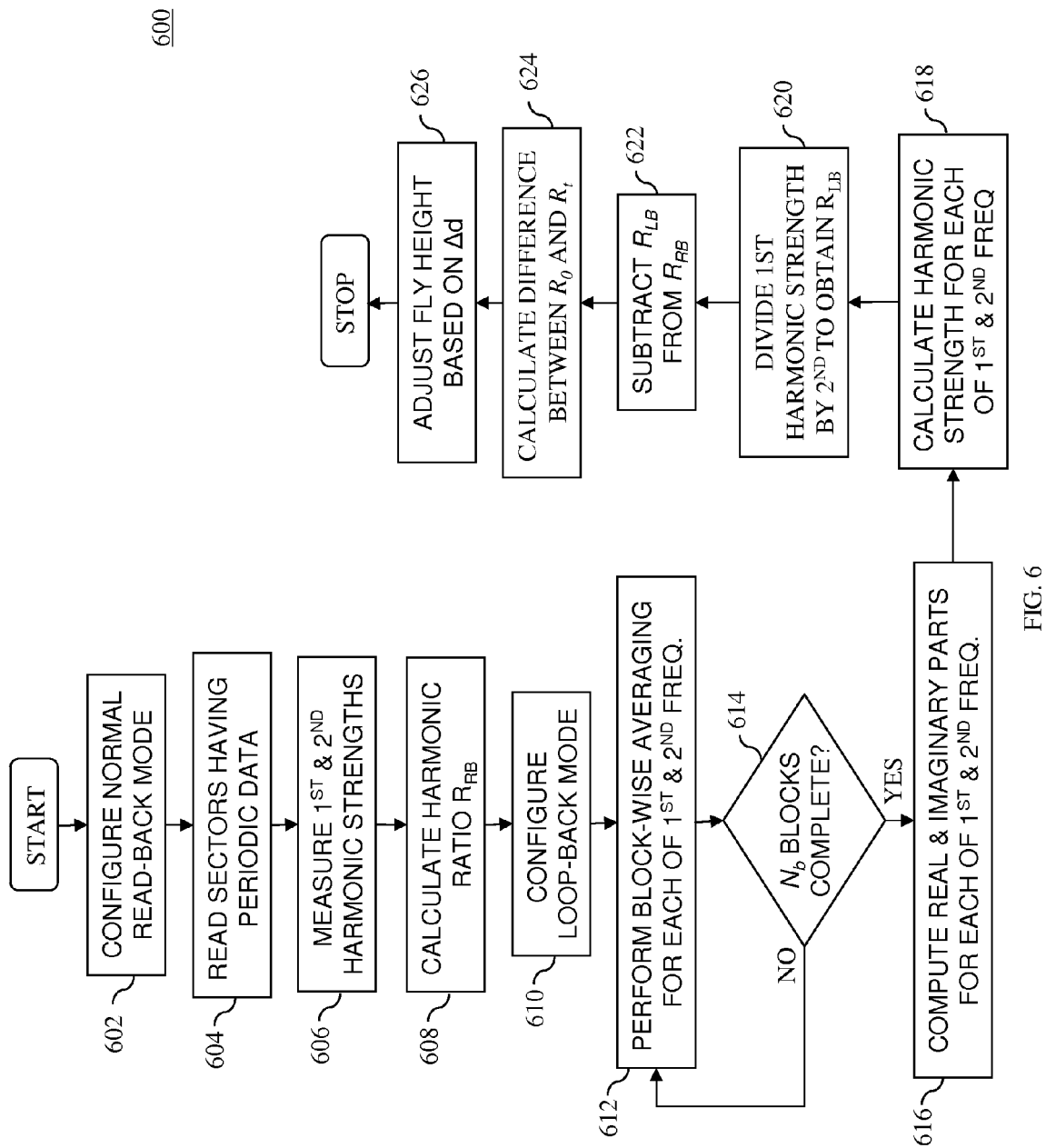
FIG. 6 shows a simplified flow diagram of a fly-height control operation according to another embodiment of the present invention that may be performed by the HDD system of FIG. 5.

FIG. 6 shows a simplified flow diagram 600 of a fly-height control operation according to another embodiment of the present invention that may be performed by HDD system 500 of FIG. 5. The fly-height control operation may be initiated using any suitable triggering event, such as those described above in relation to FIG. 3. Once initiated, controller 528 configures HDD system 500 in the read-back mode (action 602), if not already configured in such mode, by moving switch 504 between positions "a" and "b" and closing switch 510, such that heads 506 and preamplifier 508 are connected in-line, and write precompensation circuit 502 is disconnected. In addition, controller 528 disables the sampling-frequency offset (e.g., by opening switch 518), moves switch 520 to the "a" position such that RC harmonic sensor 522 of digital processor 516 is connected in-line. Once connected in the read-back mode, HDD system 500 performs actions 604, 606, and 608, which are analogous to actions 304, 306, and 308 of FIG. 3, to calculate a harmonic ratio $R_{RB,t}(k_1,k_2)$ for the read-back mode as shown above in Equation (6). Action 606 is performed by RC harmonic sensor 522, and action 608 is performed by digital processor 516 using processing not shown. Note that, similar to action 304, action 604 reads back two periodic patterns, which are typically prerecorded during manufacturing. To record the two periodic patterns, switch 504 is moved to position "a" and switch 510 is opened.

Controller 528 then configures HDD system 500 in the loop-back mode (action 610) by moving switch 504 to position "b" and opening switch 510, such that write precompensation circuit 502 is connected in-line and heads 506 and preamplifier 508 are disconnected. Additionally, controller 528 enables the sampling-frequency offset (e.g., by closing switch 518), and moves switch 520 to the "b" position, such that (1) component computation block 524 and harmonic calculation block 526 of digital processor 516 are connected in-line and (2) RC harmonic sensor 522 of digital processor 516 is disconnected. Similar to the loop-back mode of HDD system 200, write precompensation block 502 provides the same two periodic signals to RC AFE 512 that were written to the medium. The two periodic signals are processed by RC AFE 512 (preferably without lowering the cut-off frequency of the CTF), and the two conditioned periodic signals are provided to RC ADC 514.

RC ADC 514 performs asynchronous sampling on the two conditioned periodic signals to generate two sampled periodic signals. Asynchronous sampling is performed by sampling the two signals using a positive or negative sampling-frequency offset (i.e., offset from the read-back mode sampling frequency). With the sampling-frequency offset, the sampling rate is faster than the sampling rate of the read-back mode when a positive offset is applied and slower than the sampling rate of the read-back mode when a negative offset is applied. Applying the sampling-frequency offset causes the phase of each cycle of each periodic pattern to vary from the phase of the next cycle of the periodic pattern. For example, for the first periodic pattern (i.e., corresponding to $k_1$), the phase of the first periodic cycle is different from the phase of the second periodic cycle, which will be different from the phase of the third periodic cycle, and so on.

Varying the phases of the sampled periodic patterns causes the quantization error to be different from one cycle of the periodic pattern to the next. Quantization error may then be reduced by an averaging process performed by component computation block 524 (described below). This is in contrast to synchronous sampling, where the quantization error is substantially constant from one cycle of the periodic pattern to the next, and hence, the quantization error is not averaged out. Further, due to asynchronous sampling, the changes in in-band harmonic amplitudes caused by spectral aliasing vary from one cycle of the periodic pattern to the next. As a result, the effect of aliasing may also be reduced by the averaging process performed by component computation block 524 (described below). Approximately 1.0% to 1.5% frequency offset may be sufficient to reduce quantization error and frequency aliasing.

The two sampled periodic signals $x_i[n]$, where subscript i indicates the first or second periodic signal (i.e., i=1 for frequency $f_1$, i=2 for frequency $f_2$), are provided to component computation block 524, which performs block-wise averaging of the time-domain samples for each periodic signal i (action 612) as shown in Equation (8) below:

$$\tilde{x}_{i,j}[n] = \frac{1}{N_m} \sum_{l=0}^{N_m-1} x_i[n + lP + jM], \quad (8)$$

where $\tilde{x}_{i,j}[n]$ is the block-wise averaged sample for the $j^{th}$ block of the $i^{th}$ periodic signal, is the number of samples per period, $M_m$ is the number of periods per block used in the block-wise harmonic computation, M is the block length in bits or samples, the sample index n=0, 1, 2, . . . , P−1, and the block index j=0, 1, 2, . . . , $N_b$−1, where $N_b$ is the total number of blocks.

Once block-wise averaging has been performed over all $N_b$ blocks (decision 614), component computation block 524 computes, for each periodic signal i, real and imaginary parts ($H_{real}[k_i, j]$, $H_{imag}[k_i, j]$) of the harmonic strengths for each block j based on the block-wise averaged samples $\tilde{x}_{i,j}[n]$ (action 616) are computed as follows in Equations (9) and (10):

$$H_{real}[k_i, j] = \frac{1}{P} \sum_{n=0}^{P-1} \tilde{x}_{i,j}[n] \cos\left(\frac{2\pi n f_i}{P}\right) \quad (9)$$

$$H_{imag}[k_i, j] = \frac{1}{P} \sum_{n=0}^{P-1} \tilde{x}_{i,j}[n] \sin\left(\frac{2\pi n f_i}{P}\right) \quad (10)$$

The real and imaginary parts $H_{real}[k_i,j]$ and $H_{imag}[k_i,j]$ for each periodic signal i and each block j are provided to harmonic computation block 526, which computes, for each periodic signal i, a squared harmonic strength $|H[k_i]|^2$ (action 618) as shown in Equation (11) below:

$$|H[k_i]|^2 = \left[\frac{1}{N_b}\sum_{j=0}^{N_b-1} |H_{real}[k_i, j]|\right]^2 + \left[\frac{1}{N_b}\sum_{j=0}^{N_b-1} |H_{imag}[k_i, j]|\right]^2 \quad (11)$$

RC digital processor 516 (using processing not shown) divides the squared harmonic strength $|H[k_i]|^2$ for the first periodic signal (i.e., corresponding to $k_1$) by the squared harmonic strength $|H[k_i]|^2$ for the second periodic signal (i.e., corresponding to $k_2$) to obtain the harmonic ratio $R_{LB,t}(k_1,k_2)$ for the loop-back mode at time t (action 620) as follows:

$$R_{LB,t}(k_1, k_2) = \ln\left(\frac{|H[k_1]|}{|H[k_2]|}\right) \quad (12)$$

where $H[k_1]$ and $H[k_2]$ are determined by taking the square root of $H[k_1]^2$ and $H[k_2]^2$, respectively. Then, RC digital processor 516 subtracts the harmonic ratio $R_{LB,t}(k_1,k_2)$ for the loop-back mode from the harmonic ratio $R_{RB,t}(k_1,k_2)$ for the read-back mode to obtain a harmonic ratio $R_t(k_1,k_2)$ at time t (action 622). Subtracting the harmonic ratio $R_{LB,t}(k_1,k_2)$ from the harmonic ratio $R_{RB,t}(k_1,k_2)$ removes the environment-induced variations of RC AFE 512. The resulting harmonic ratio $R_t(k_1,k_2)$ is analogous to harmonic ratio $R_t(k_1,k_2)$ in Equation (3), without the environmental induced variations in RC AFE 512.

RC digital processor 516 subtracts (using processing not shown) an initial harmonic ratio $R_0(k_1,k_2)$, determined, for example, during manufacturing in a manner analogous to that described above in relation to action 104 of FIG. 1, from harmonic ratio $R_t(k_1,k_2)$ as shown in Equation (4) to determine how much the initial harmonic ratio $R_0(k_1,k_2)$ has changed (action 624) (e.g., determine ΔR). Note that, the procedure followed in measuring the initial harmonic ratio $R_0(k_1,k_2)$ may be the same as that described above for measuring the harmonic ratio $R_t(k_1,k_2)$ except that it is done at t=0. The change in fly height Δd may be determined based on ΔR, and the change in fly height Δd or ΔR may be used by a fly-height controller (not shown) to adjust the fly height (action 626) in a manner analogous to that described in relation to action 114.

Figure 7:
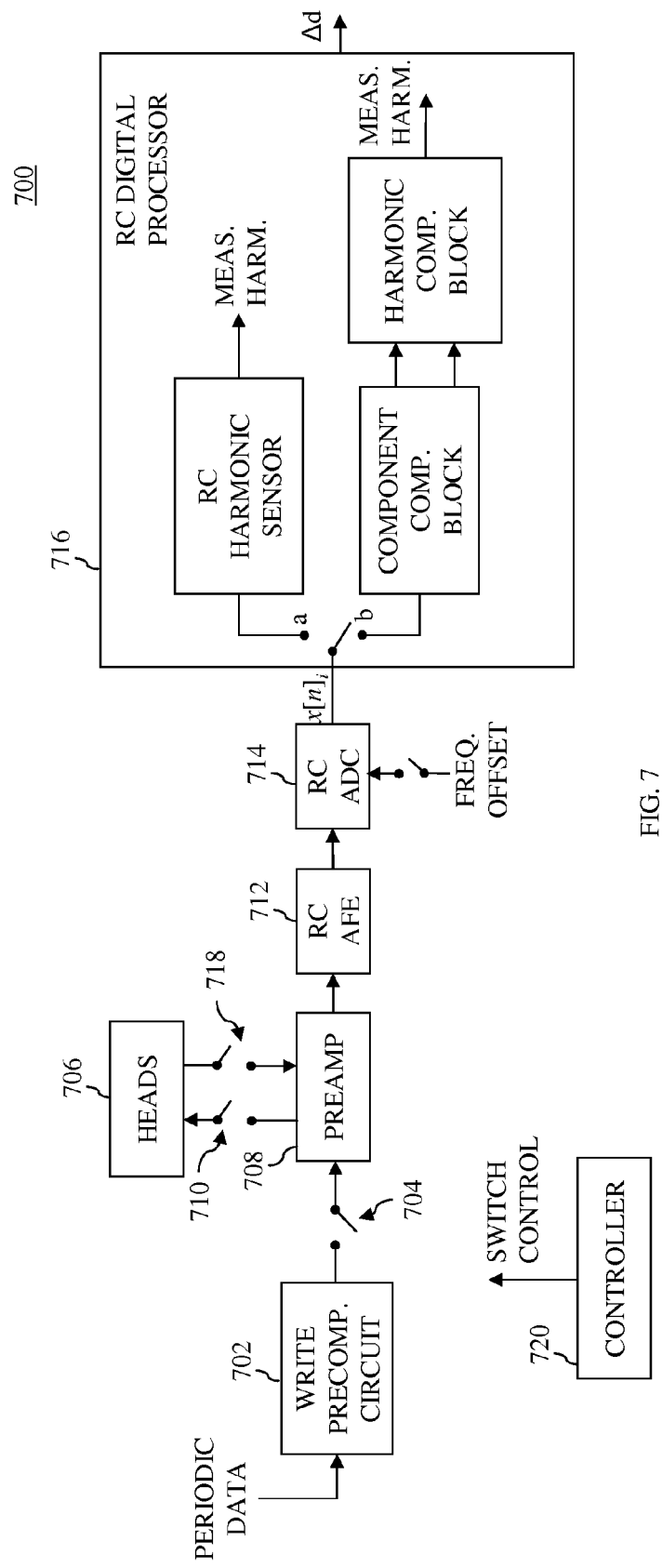
FIG. 7 shows simplified block diagram of at least part of an HDD system according to another embodiment of the present invention that employs asynchronous sampling to control fly height.

FIG. 7 shows simplified block diagram of an HDD system 700 according to another embodiment of the present invention that employs asynchronous sampling to control fly height. HDD system 700 has write precompensation circuit 702, heads 706, preamplifier 708, RC AFE 712, RC ADC 714, and RC digital processor 716, which perform operations similar to those of the analogous processing of FIG. 5. To control fly height, HDD system 700 operates in a manner analogous to that of HDD system 500 (e.g., as described in relation to FIG. 6). However, in loop-back mode, controller 720 (i) connects both write precompensation circuit 702 and preamplifier 708 in-line by closing switch 704, and (ii) disconnects heads 706 (and consequently the medium) by opening switches 710 and 718. This is in contrast to HDD system 500, which disconnects preamplifier 508 during the loop-back mode. During the read-back mode, controller 720 (i) connects the read elements of heads 706 in-line by closing switch 718, (ii) disconnects the write element of heads 706 by opening switch 710, and (iii) disconnects write precompensation circuit 702 by opening switch 704.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method usable to control fly height of a head over a medium in a data storage device, the method comprising:
   (a) determining, in a read-back mode, a first value based on a first signal received by a read path of the data storage device, the first signal corresponding to pre-recorded data read from the medium and characterized by at least one periodic pattern, wherein the first value is generated by sampling the first signal at a first sampling frequency;
   (b) determining, in a loop-back mode, a second value based on a second signal received by the read path directly from a write path of the data storage device, the second signal bypassing the medium and characterized by the at least one periodic pattern, wherein the second value is generated by sampling the second signal at a second sampling frequency different from the first sampling frequency;
   (c) generating a third value based on the first and second values, wherein the third value is usable to control the fly height.

2. The method of claim 1, further comprising:
   (d) controlling the fly height based on the third value.

3. The method of claim 2, further comprising determining, prior to determining the first value, an initial value corresponding to an initial fly height, wherein controlling the fly height in step (d) is further based on the initial value.

4. The method of claim 3, wherein step (d) comprises:
   (d1) computing a difference between the third value and the initial value; and
   (d2) adjusting the fly height based on the difference.

5. The method of claim 1, wherein:
   the at least one periodic pattern comprises first and second periodic patterns; and
   step (b) comprises:
      (b1) sampling the second signal to generate first and second sets of second-signal samples corresponding to the first and second periodic patterns, respectively;
      (b2) averaging the first and second sets of second-signal samples to generate averages for the first and second sets of second-signal samples, respectively; and
      (b3) generating the second value based on the averages for the first and second sets of second-signal samples.

6. The method of claim 5, wherein step (a) comprises:
   (a1) sampling the first signal to generate first and second sets of first-signal samples corresponding to the first and second periodic patterns, respectively;
   (a2) determining first and second harmonic strengths based on the first and second sets of first-signal samples, respectively; and
   (a3) generating the first value based on the first and second harmonic strengths.

7. The method of claim 5, wherein:
   step (b2) further comprises determining third and fourth harmonic strengths based on the averages for the first and second sets of second-signal samples, respectively; and
   step (b3) comprises generating the second value based on the third and fourth harmonic strengths.

8. The method of claim 7, wherein:
   step (b2) comprises:
      (i) determining a first set of real and imaginary components based on the averages for the first set of second-signal samples;
      (ii) determining the first harmonic strength based on the first set of real and imaginary components;
      (iii) determining a second set of real and imaginary components based on the averages for the second set of second-signal samples; and (iv) determining the second harmonic strength based on the second set of real and imaginary components.

9. An apparatus usable to control fly height of a head over a medium in a data storage device, the data storage device having a read path that is configurable in (i) a read-back mode to receive a first signal corresponding to pre-recorded data read from the medium and characterized by at least one periodic pattern and (ii) a loop-back mode to receive a second signal directly from a write path of the data storage device, the second signal bypassing the medium and characterized by the at least one periodic pattern, wherein the apparatus comprises:
- an analog-to-digital converter that (i) samples, in the read-back mode, the first signal at a first sampling frequency and (ii) samples, in the loop-back mode, the second signal at a second sampling frequency different from the first sampling frequency; and
- a digital processor that:
  - determines, in the read-back mode, a first value based on samples of the first signal;
  - determines, in a loop-back mode, a second value based on samples of the second signal;
  - generates a third value based on the first and second values, wherein the third value is usable to control the fly height.

10. The apparatus of claim 9, wherein:
the apparatus is the data storage device; and
the apparatus controls the fly height based on the third value.

11. The apparatus of claim 10, wherein:
the digital processor determines, prior to determining the first value, an initial value corresponding to an initial fly height; and
the apparatus controls the fly height further based on the initial value.

12. The apparatus of claim 11, wherein:
the digital processor computes a difference between the third value and the initial value; and
the apparatus adjusts the fly height based on the difference.

13. The apparatus of claim 9, wherein:
the read path further comprises a preamplifier;
the write path comprises a write precompensation circuit;
the read path is configurable, in the read-back mode, to process the first signal using the preamplifier; and
the read path is configurable, in the loop-back mode, to receive the second signal from the write precompensation circuit, wherein the second signal bypasses the preamplifier.

14. The apparatus of claim 9, wherein:
the read path further comprises a preamplifier;
the write path comprises a write precompensation circuit;
the read path is configurable, in the read-back mode, to process the first signal using the preamplifier; and
the read path is configurable, in the loop-back mode, to receive the second signal from the write precompensation circuit, wherein the preamplifier processes the second signal.

15. The apparatus of claim 9, wherein:
the at least one periodic pattern comprises first and second periodic patterns; and
the analog-to-digital converter samples, in the loop-back mode, the second signal to generate first and second sets of samples corresponding to the first and second periodic patterns, respectively; and
the digital processor comprises:
- a component compensation block that, in the loop-back mode, averages the first and second sets of samples to generate averages for the first and second sets of samples, respectively; and
- a harmonic computation block that, in the loop-back mode, generates the second value based on averages for the first and second sets of samples.

16. The apparatus of claim 15, wherein:
the analog-to-digital converter samples, in the read-back mode, the first signal to generate third and fourth sets of samples corresponding to the first and second periodic patterns, respectively;
the digital processor comprises a harmonic sensor that determines, in the read-back mode, first and second harmonic strengths based on the first and second sets of samples, respectively; and
the digital processor generates the first value based on the first and second harmonic strengths.

17. The apparatus of claim 15, wherein:
the harmonic compensation block determines first and second harmonic strengths based on the averages for the first and second signals, respectively; and
the digital processor generates the second value based on the first and second harmonic strengths.

18. The apparatus of claim 17, wherein:
the component computation block determines (i) a first set of real and imaginary components based on the averages for the first set of samples, and (ii) a second set of real and imaginary components based on the averages for the second set of samples; and
the harmonic computation block determines (i) the first harmonic strength based on the first set of real and imaginary components and (ii) the second harmonic strength based on the second set of real and imaginary components.

* * * * *